(12) United States Patent
Krüger et al.

(10) Patent No.: US 11,754,439 B2
(45) Date of Patent: Sep. 12, 2023

(54) METHOD AND DEVICE FOR PHOTOMETRICAL CHARTING OF A LICENSE PLATE FOR A VEHICLE

(71) Applicant: TechnoTeam Holding GmbH, Ilmenau (DE)

(72) Inventors: Udo Krüger, Werra-Suhl-Tal (DE); Christian Schwanengel, Ilmenau (DE); Tanja Thiele, Ilmenau (DE)

(73) Assignee: TechnoTeam Holding GmbH, Ilmenau (DE)

( * ) Notice: Subject to any disclaimer, the term of this patent is extended or adjusted under 35 U.S.C. 154(b) by 184 days.

(21) Appl. No.: 17/322,804

(22) Filed: May 17, 2021

(65) Prior Publication Data
US 2021/0364428 A1 Nov. 25, 2021

(30) Foreign Application Priority Data
May 19, 2020 (DE) ...................... 10 2020 206 275.7

(51) Int. Cl.
*G01J 1/02* (2006.01)
*G06T 7/00* (2017.01)
(Continued)

(52) U.S. Cl.
CPC .......... *G01J 1/0266* (2013.01); *G01J 1/0242* (2013.01); *G06K 7/10366* (2013.01); *G06T 5/50* (2013.01); *G06T 7/60* (2013.01); *G06T 7/97* (2017.01)

(58) Field of Classification Search
None
See application file for complete search history.

(56) References Cited

U.S. PATENT DOCUMENTS

2019/0128774 A1 5/2019 Merle et al.
2019/0317217 A1 10/2019 Day et al.

FOREIGN PATENT DOCUMENTS

CN 101726406 A 6/2010
CN 202221368 U 5/2012
(Continued)

OTHER PUBLICATIONS

Germany Office Action, dated Jan. 21, 2021 for corresponding German Application No. DE 10 2020 206 275.7 with English translation (7 pages).
(Continued)

*Primary Examiner* — Xiaolan Xu
(74) *Attorney, Agent, or Firm* — Intellectual Property Law Group LLP (57) ABSTRACT

The invention relates to a method for photometrical charting of a reflectance standard (Z) illuminated by a license plate light (1). A camera (4) releasable by a control unit (5) is arranged and aligned relative to a holding device (3) configured for holding a reflectance standard (Z) in such a way, that a luminance density image (B1, B2) recorded by the camera (4) at least covers the reflective surface (Z.1) of a reflectance standard (Z) held by the holding device (3). A license plate light (1) is arranged in a positioning device (2) which is movable by the control unit (5). The positioning device (2) is controlled by the control unit (5) in such a way that the license plate light (1) arranged therein is traversed to at least one position (P1, P2), optionally to multiple positions (P1, P2) sequentially, relative to the reflectance standard (Z) arranged in the holding device (3) and held there. In each position (P1, P2), recording of at least one luminance density image (B1, B2) is triggered. An overall image (B) is formed from the recorded luminance density images (B1, B2) recorded by the camera (4). Furthermore,
(Continued)

the invention relates to an arrangement for performing this method.

16 Claims, 7 Drawing Sheets

(51) Int. Cl.
  *G06K 7/10* (2006.01)
  *G06T 5/50* (2006.01)
  *G06T 7/60* (2017.01)

(56) References Cited

FOREIGN PATENT DOCUMENTS

| | | | |
|---|---|---|---|
| CN | 101799357 | B | 9/2013 |
| CN | 104249667 | A | 12/2014 |
| CN | 104502350 | A | 4/2015 |
| DE | 102013221415 | A1 | 4/2015 |
| EP | 2127944 | A1 | 12/2009 |
| GB | 2 307 312 | A | 5/1997 |
| JP | 2006-250895 | A | 9/2006 |
| JP | 2015143649 | A * | 8/2015 |
| JP | 2015143649 | A | 8/2015 |

OTHER PUBLICATIONS

European Search Report dated Oct. 12, 2021 for corresponding European application No. 21 17 1954 with English translation (15 pages).
"Regulation No. 4 of the 1-15 Economic Commission for Europe of the United Nations (UN/ECE)—Uniform conditions concerning the approval of devices for the illumination of rear registration plates of power-driven vehicles and their trailers ", Official Journal of the European Union L31/35, Jan. 31, 2009, URL: http://data.europa.eu/eli/reg/2009/4(2)/oj, with English translation (total 40 pages).
TechnoTeam Bildverarbeitung GmbH, "Video Photometer Lmk Imaging Light and Colour Measuring Systems", Jan. 1, 2019 (9 pages), URL:https://www.technoteamvision.com/apool/tnt/content/eS183/eS432/eS733/e8233/Prospekt2019_webl_eng.pdf.
Henning Kiel, "Evaluation of motor vehicle headlights with light simulation ", Dissertation submitted to the Faculty of Mechanical Engineering at the Technical University of Ilmenau, May 11, 2012, pp. 1 to 199, URL:http://d-nb.info/1024884686/34, with English Abstract on p. 6.
Taiwan Office Action dated Sep. 28, 2022 for corresponding Taiwan application No. 110117143 with English translation, pp. 1-10.
Notice of Preliminary Rejection, dated May 2, 2023, for corresponding Korea application No. 10-2021-0064901 with English translation, pp. 1-15.
China Office Action, dated May 24, 2023, for corresponding China application No. 202110543149.4 with English translation, pp. 1-11.

* cited by examiner

METHOD AND DEVICE FOR PHOTOMETRICAL CHARTING OF A LICENSE PLATE FOR A VEHICLE

CROSS-REFERENCE TO RELATED APPLICATION

This application claims priority to German patent application no. 10 2020 206 275.7 filed on May 19, 2020, which is hereby incorporated by reference in its entirety.

BACKGROUND

1. Field of Invention

The invention relates to a method and to an arrangement for photometrical charting of a license plate for a vehicle.

2. Background Art

The visibility of illuminated license plates of a vehicle is subject to legal and normative regulations, inter alia the norms ECER004, the Chinese Guobiao (GB) Standard GB 18408-2015 "Photometric characteristics of devices for the illumination of rear registration plates of motor vehicles and their trailers", of the Society of Automotive Engineers (SAE) Standard SAE J578 "Color Specifications for Electrical Signal Lighting Devices" etc. Methods for checking compliance with these regulations comprise selective photometrical charting of an illuminated license plate.

In a measurement setup for photometrical charting of a license plate light provided and configured for illuminating a license plate on a vehicle, the license plate is replaced by a reflectance standard which is configured and arranged in a geometrically equal way as the license plate in order to achieve a standardized and comparable measurement. The reflectance standard is also referred to as a reflectance normal.

For the normative testing of the illumination setting it is advantageous if the reflectance standard has a spectrally neutral, preferably lambertian, i.e. diffuse, reflecting surface. Anyway, other reflectance characteristics are likewise possible which are charted and taken into account, e.g. corrected, in a subsequent testing of the illumination setting.

In a measurement setup known in the prior art, a reflectance standard is illuminated by a license plate light or by multiple license plate lights, which is/are arranged relative to the reflectance standard corresponding to the mounting position of a license plate in the mounted (i.e. mounted to the vehicle) state.

Here, a photometer configured for measuring photometric characteristics, e.g. a luminance distribution, is positioned perpendicular to the reflectance standard or at least to a partial area of the reflectance standard. For certain, predetermined areas of the reflectance standard, punctual measurement values are merged, e.g. to form an integral value or average value, and compared to a predetermined photometric nominal value.

SUMMARY

The object of the invention is to provide a method for the improved photometric charting of a reflectance standard illuminated by at least one license plate light. According to the invention, this object is achieved by a method according to claim 1.

Moreover, the object of the invention is to provide an arrangement for the improved photometric charting of a reflectance standard illuminated by at least one license plate light. According to the invention, this object is achieved by an arrangement according to claim 12.

Advantageous embodiments are subject of the dependent claims.

In a method for photometrical charting of a reflectance standard illuminated by a license plate light for a vehicle, a camera releasable by a control unit is arranged and aligned relative to a holding device configured for holding a reflectance standard in such a way, that a luminance density image recorded by the camera at least covers the reflective surface of a reflectance standard held by the holding device. Here and in the following, a luminance density image is understood to be a digital description of a luminance density distribution onto the planar imaging surface of a sensor, e.g. capturing plane of a camera, as proposed by the published draft standard for the standard DIN 5032-10:2019-09—Entwurf: Lichtmessung—Teil 10: Leuchtdichtemesskamera, Begriffe, Eigenschaften und deren Kennzeichnung.

Preferably, the camera is arranged and aligned such that the luminance density image recorded by the camera completely covers the reflecting surface of the reflectance standard. In an embodiment of the method it is likewise possible to arrange and align the camera such that the luminance density image recorded by the camera covers the reflecting surface of the reflectance standard in a partial area, wherein the partial area is chosen such that the determination of a photometric characteristic of the reflectance standard to an extent required by a norm or a legal provision is possible from the luminance density image covering this partial area.

The camera is configured for recording luminance density images which determine the planar (two dimensional) distribution of a photometric characteristic. Preferable, the camera is configured as a luminance density measurement camera for quantitative, particularly preferably fed back, determination of a photometric characteristic.

A license plate light configured for illuminating a license plate mounted to a vehicle is arranged in a positioning device movable by the control unit. Preferably, the license plate light is clamped or held in the positioning device.

The reflectance standard is arranged in the holding device in such a way that a reflective surface of the reflectance standard is captured by the camera.

In an embodiment of the invention, the camera is aligned at an arbitrary angle, in particular not necessarily perpendicular to the reflecting surface of the reflectance standard. When aligning the optical axis of the camera non-perpendicular to the reflecting surface of the reflectance standard, a photometric and/or geometric correction of the photometric luminance density image recorded by the camera is required.

Such a correction may be performed by using the known characteristics of the reflectance standard. Furthermore, the geometry of the reflectance standard recorded in the luminance density image is registered, i.e. matched with the known geometry of the reflectance standard, and used for geometrical rectification.

In an embodiment, the measurement distance, i.e. the distance between the lens sided main plane of the lens of the camera and the reflecting surface of the reflectance standard, is shortened, resulting in greater angels of vision toward the margin of the reflectance standard. The reflection properties which are different depending on the angle must be known and may then be corrected by respective weighting as a function of position.

According to the invention, the positioning device is controlled by the control unit in such a way that the license plate light arranged, e.g. clamped or held, therein is traversed to at least one position relative to the reflectance standard arranged in the holding device and held there. Optionally, the positioning device is controlled in such a way that the license plate light is sequentially traversed to multiple positions and held there, respectively.

In each one of the optionally multiple positions reached, the license plate light is switched on by the control unit or remains on if it had already been on. The recording of a luminance density image is triggered if the license plate light has been on for a predetermined burning-in period. An overall image is created from the luminance density images recorded in each one of the positions reached.

The overall image may for example be formed by summing up each of the recorded luminance density images pixel by pixel. Is it also possible to register the individual luminance density images against each other and/or to filter, e.g. smooth, them and to form the overall image from the plurality of registered and/or filtered luminance density images.

When registering luminance density images against each other, pixel coordinates are transformed, e.g. by shifting and/or scaling and/or rotating and/or perspective distortion or by an affine transformation, such that a similarity measure or a congruence measure between the registered luminance density images, e.g. a correlation based similarity measure, is maximized Thus, the local accuracy of the luminance density distribution captured in the overall image is improved.

In a filtering process, linear filters, e.g. a low pass for smoothing or a high pass for edge enhancement, may be applied to the luminance density images. It is also possible to apply nonlinear filters, e.g. a median filter, to the luminance density images. Likewise, methods for morphological image processing may be applied by firstly binarizing a luminance density image, e.g. by applying a threshold criterion, to obtain a binary image, performing morphological operations on the binary image and retransferring the processed binary image, e.g. as a masking, to the luminance density image. Interference and artifacts which may for example be caused by sensor noise may be reduced by filtering.

It is also possible to subject luminance density images to a processing being a function of position, i.e. linked to the position of a pixel. This allows for compensating imperfections in the camera and/or in the reflectance standard whose local distribution in the luminance density image is known. It is for example possible to compensate a marginal diminution of the incident illumination on the sensor of the camera caused by the camera lens.

It is also possible to compensate pixel by pixel differences of the light reflected by the reflectance standard and captured by the camera which in particular result from an angle dependent, i.e. non-perfect diffuse, reflectivity with low distance between the main plane of the camera lens and the reflecting surface of the reflectance standard. This allows for measurement setups with low requirements to the optical quality of the camera and the reflectance standard.

Likewise, combinations of different methods for transforming and filtering luminance density images are possible.

Furthermore, it is possible to record a plurality of luminance density images at each of the positions reached and to compose a luminance density image with increased dynamic range (HDR, high dynamic range) on this basis. It is also possible to reduce the noise impact of an image sensor by recording luminance density images with respectively equal integration time.

The overall image formed this way represents the distribution of the photometrical characteristic captured by means of the camera in each individual luminance density image which would result if the reflectance standard was simultaneously illuminated by license plate lights respectively distributed at the positions that the positioning device moves to.

Thus, by the proposed method, the distribution of these photometrical characteristics for a reflectance standard arranged at a vehicle and also illuminated by multiple license plate lights arranged at that vehicle may be determined. For this purpose, the single license plate light used in the photometrical measurement method has to be sequentially moved to the relative positions (relative to the reflectance standard held in the holding device) which correspond to the relative positions of the multiple license plate lights (relative to the license plate likewise arranged at the vehicle) arranged at the vehicle.

An advantage of the method is that the planar charting of the photometrical characteristic occurs in respectively one step by recording a luminance density image. Thus, the time consuming point by point measurement of the reflecting surface of the reflectance standard may be avoided.

Another advantage of the method is that the effect of widely varied arrangements of license plate lights on the distribution of photometrical characteristics may be charted due to the positioning device being movable (i.e. programmably movable) by means of the control unit. In particular, illumination settings for different geometrical dimensions of a reflectance standard and for different arrangements of license plate lights relative to a reflectance standard may be very easily and rapidly be charted.

For example, for a reflectance standard illuminated by at least one license plate light the distribution of the photometrical characteristic may be determined which arises in different types of vehicles and/or in different series of types of vehicles which differ in the arrangement of the at least one license plate light relative to the reflectance standard. In particular, such a sequence of measurements does not require mounting the reflectance standard or the license plate light anew.

Thus, widely varied geometrical arrangements of a license plate light or multiple license plate lights on a vehicle can be very easily and rapidly be checked with regard to their suitability for the illumination of license plates conforming to standards by the method according to the invention. Moreover, it is particularly easily possible to evaluate new or modified arrangements of license plate lights with regard to their illumination quality achieved. In particular, when modifying a geometrical arrangement of the at least one license plate light to be checked, physical disassembly and assembly are not required; instead, this modification may be performed by reprogramming or parametrizing the control unit.

In an exemplary embodiment of the method, the reflectance standard is arranged relative to the camera in such a way that each point on its reflective surface appears under an angle of at most 40 degrees, preferably under an angle of at most 5 degrees, relative to the optical axis of the camera. In this embodiment, each luminance density image is adapted to the geometry of the reflecting surface of the reflectance standard by projective rectification.

For example, a luminance density image is projectively rectified in such a way that the contour of the image of the reflectance standard comprised therein matches the contour of the reflectance standard. For example, in case of a rectangularly shaped reflecting surface of the reflectance standard, the four corner points of the typically projectively distorted image of this surface are recognized in the luminance density image and, based on this, a projective rectification is determined which transforms the coordinates of these corner points in such a way that a rectangle is spanned which haves the same aspect ratio as the reflecting surface or which, taking account of the reproduction scale of the camera, is equal in size with the reflecting surface.

An advantage of this embodiment is that adjustment of the camera relative to the reflectance standard (and thus also relative to the holding device) is significantly facilitated as deviations of the optical axis of the camera from the surface normal on the reflectance standard may very easily be corrected by projective rectification.

In an embodiment of the invention, at least one luminance density image is recorded by the camera when the license plate light is in a first position. Based on this at least one luminance density image recorded by the camera, a calculated luminance density image for at least a second or further position of the license plate light is calculated. In other words: From the luminance density image recorded when the reflectance standard is illuminated with the license plate light arranged in the first position, at least one luminance density image is calculated which would be observed if the reflectance standard was illuminated with the license plate light in a second or further position.

A calculated luminance density image may for example be obtained from a recorded luminance density image by utilizing symmetry relations between the first position and the second or further positions of the license plate light. For example, if the first and second position of the license plate light is symmetrical to a symmetry plane which is perpendicular on the reflectance standard, a calculated luminance density image can be obtained by mirroring a luminance density image recorded in the first position on a symmetry axis along which the symmetry plane intersects the reflecting surface of the reflectance standard.

In the alternative or in addition, a calculated luminance density image may be obtained by shifting a recorded luminance density image by a shift corresponding to a distance between the first and the second or the further position of the license plate light.

The overall image is formed by superposing the recorded luminance density images and the at least one calculated luminance density image An advantage of this embodiment is that one does not have to move to the second or further position of the license plate light and record a luminance density image there. This way, the measurement time may be significantly reduced.

In an embodiment of the method, the recording of a luminance density image at a position reached is released only after the license plate light has been on for a predetermined burning-in period. The license plate light may be switched on after reaching the position for at least the burning-in period and be switched off again after the subsequent recording of at least one luminance density image in this position. However, it is also possible in an advantageous way to switch the license plate light on once prior to releasing the recording of the first luminance density image at the first position reached and keep it on until having recorded the last luminance density image at the last position reached.

During the burning-in period of the license plate light, the distribution of a photometrical characteristic in the range of the reflectance standard may vary, e.g. geometrically and/or in the spectral characteristic. Due to this embodiment, an impact of such variations on the measurement result is excluded or remarkably reduced.

It is possible that luminance density images and thus also the overall image formed from them also cover areas outside the reflectance standard. In an embodiment of the method, in the partial area of the overall image covering the reflective surface of the reflectance standard, image areas are defined. An image area average value is determined for each image area. The image area average may be obtained as a weighted sum of all pixel values of the respective image area. For example, the image area average can be obtained by relating a sum of pixel values in a partial area in each case to a plane (i.e.: the number of pixels) of the respective partial area.

The image areas may be arranged non-overlapping in the partial area of the overall image covering the reflecting surface of the reflectance standard. However, it is also possible that such image areas are partially overlapping.

An advantage of this embodiment is that, instead of a planar distribution of a photometrical characteristic, only a reduced set of photometrical parameters (set of image area averages assigned to the image areas) is determined which is sufficient for and facilitating the check of the illumination setting for the reflectance standard required conforming to standard or to regulations. In particular, compliance with requirements conforming to standard or to regulations may be checked this way independent of the resolution and setup of the camera, in particular independent of its chip size and reproduction scale.

In an embodiment of the method, the reflectance standard held in the holding device is automatically identified.

Identification of the reflectance standard may for example be carried out by means of a RFID transponder arranged thereon. RFID transponders are light and reliable to read out and may easily be arranged on the rear side of the reflectance standard which is invisible for the optical measurement.

In the alternative or in addition, the identification may be carried out by matching the image of the reflectance standard in a luminance density image or in the overall image with known dimensions of types of reflectance standards taking account of a known reproduction scale and/or a known geometrical distortion of the camera, and by assigning the type which matches best. In an advantageous way, identification may thus be achieved without additional hardware.

Based on the identification of the reflectance standard, the image areas required conforming to standard or to regulations or arbitrarily chosen may be determined, for which an image area average is determined in each case.

Thus, it is possible to assign a standard or regulation to each reflectance standard, according to which the distribution of the photometrical characteristic is to be determined.

In an embodiment of the method, in a validation step, a trajectory of the positioning device with the license plate light arranged therein relative to the holding device is planned, the trajectory being suitable for charting a reflectance standard. In the validation step, this trajectory is carried out relative to a measurement dummy. In other words: the positioning device is moved such that the license plate light held therein is arranged relative to the measurement dummy exactly in the same way as it would be arranged in case of the measurement with the planned trajectory relative to the holding device with the reflectance standard held therein.

The measurement dummy is configured identically with regard to outer dimensions to the holding device with the reflectance standard arranged therein and arranged such that the positioning device and/or the license plate light remain/ remains unharmed in case of a collision of the positioning device and/or the license plate light with the measurement dummy. For example, the measurement dummy is made of a flexible plastic which yields when being touched. In the alternative or in addition, the measurement dummy may also be made from a material which will already destroyed when subjected to a force which would not yet suffice to damage the positioning device or the license plate light.

Moreover, the measurement dummy is arranged such that a collision with the holding device and/or the reflectance standard is excluded as the planned trajectory is carried out relative to the measurement dummy. Furthermore, it is arranged such that a collision with the measurement dummy is excluded as the trajectory is carried out relative to the holding device.

In this embodiment, charting of the reflectance standard is only enabled after the validation step has been carried out successfully. A validation step has been carried out successfully if the positioning device and the license plate light did not collide with the measurement dummy during execution of the planned trajectory relative to the measurement dummy.

An advantage of this embodiment is that errors in the planning of the trajectory of the positioning device may be detected prior to a charting operation in a particularly cost efficient and save way. This way, damage to the positioning device, the license plate light, the holding device and/or the reflectance standard, which could be caused by an erroneously planned trajectory, may be avoided.

An arrangement for photometrical charting of a reflectance standard for a vehicle comprises a control unit, a holding device configured for holding a reflectance standard, and a camera configured for recording luminance distribution images of a reflectance standard held in the holding device. According to the invention, the arrangement further comprises a positioning device configured for holding, preferably clamping or holding, a license plate light.

In an embodiment of the arrangement, the camera is aligned at an arbitrary angle, in particular not necessarily perpendicular to the reflecting surface of the reflectance standard. When aligning the optical axis of the camera non-perpendicular to the reflecting surface of the reflectance standard, a photometric and/or geometric correction of the photometric luminance density image recorded by the camera is required.

Such a correction may be performed by using the known characteristics of the reflectance standard. Furthermore, the geometry of the reflectance standard recorded in the luminance density image is registered, i.e. matched with the known geometry of the reflectance standard, and used for geometrical rectification.

In an embodiment, the measurement distance, i.e. the distance between the lens sided main plane of the lens of the camera and the reflecting surface of the reflectance standard, is shortened, resulting in greater angels of vision toward the margin of the reflectance standard. The reflection properties which are different depending on the angle must be respectively known and may then be corrected by respective weighting as a function of position.

The control unit is coupled with the camera and with the positioning device and configured to traverse a license plate light held by the positioning device to at least one predetermined position, optionally to multiple predetermined positions sequentially, relative to the holding device, and to switch on the license plate light. Moreover, the control unit is configured to release the recording of at least one luminance density image by the camera.

Furthermore, the control unit and/or the camera are/is configured to determine an overall image from the luminance density images recorded by the camera according to one of the above described methods.

The overall image formed this way represents the distribution of the photometrical characteristic captured by means of the camera in each individual luminance density image which would result if the reflectance standard was simultaneously illuminated by license plate lights respectively distributed at the positions that the positioning device moves to.

Thus, by the proposed arrangement, the distribution of these photometrical characteristics for a reflectance standard arranged at a vehicle and also illuminated by multiple license plate lights arranged at that vehicle may be determined. For this purpose, a license plate light arranged (e.g. clamped or held) in the positioning device has to be sequentially moved to the relative positions (relative to the reflectance standard held in the holding device) which correspond to the relative positions of the multiple reflectance standards (relative to the license plate likewise arranged at the vehicle) arranged at the vehicle and which are predetermined by the control unit.

An advantage of the arrangement is that the planar charting of the photometrical characteristic occurs in respectively one step by recording a luminance density image. Thus, the time consuming scanning of the reflecting surface of the reflectance standard using a photometer measuring point by point may be avoided.

Another advantage of the arrangement is that the effect of widely varied arrangements of license plate lights on the distribution of photometrical characteristics may be charted due to the positioning device being movable (i.e. programmably movable) by means of the control unit. In particular, illumination settings for different geometrical dimensions of a reflectance standard and for different arrangements of license plate lights relative to a reflectance standard may be very easily and rapidly be charted.

For example, for a reflectance standard, the distribution of the photometrical characteristic may be determined which arises in different types of vehicles and/or in different series of types of vehicles which differ in the arrangement of the at least one license plate light relative to the reflectance standard. In particular, such a sequence of measurements does not require mounting the reflectance standard or the license plate light anew.

Thus, widely varied geometrical arrangements of a license plate light or multiple license plate lights on a vehicle can be very easily and rapidly be checked with regard to their suitability for the illumination of license plates conforming to standards by the arrangement according to the invention. Moreover, it is particularly easily possible to also evaluate new or modified arrangements of license plate lights with regard to their illumination quality achieved. In particular, when modifying a geometrical arrangement of the at least one license plate light to be checked, physical disassembly and assembly are not required; instead, this modification may be performed by reprogramming or parametrizing the control unit.

In an embodiment of the arrangement, the holding device comprises a holding base and a holding socket, wherein the holding base is configured for receiving the holding socket in a releasable, form-fitting and free of play way, and wherein the holding socket is configured to receive the reflectance standard. This embodiment allows for replacing the reflectance standard to be charted in a particularly easy way, in particular without further assembly steps and without tools. Thus, this embodiment is particularly suitable for the photometrical charting of a multitude of different geometrical dimensions of reflectance standards.

In an embodiment of the arrangement, the holding base and/or the holding socket are configured to be magnetically coupled to each other. This embodiment allows for a tight, well reproducible holding of the reflectance standard on the holding device and at the same time for a particularly easy replaceability of the reflectance standard.

In an embodiment of the arrangement, an RFID transponder is arranged at the holding socket, facilitating identification of the reflectance standard held in the holding device. This way, manual identification of the reflectance standard presently charted by the arrangement and therefore also of the standard for a measurement performed thereon may be dispensed with and the measurement operation may be accelerated. Moreover, the risk, that the measurement results are assigned to a wrong reflectance standard and thus to a wrong standard, is eliminated or reduced.

In an embodiment of the arrangement, the holding device comprises an RFID reading device coupled with the control unit and configured for reading out an identifier of an RFID transponder arranged at the reflectance standard or at the holding socket and for transmitting this identifier to the control unit, wherein the control unit is configured to determine the at least one standard for checking the illumination setting for the reflectance standard required conforming to standard or to regulations to be applied in a measurement from a transmitted identifier.

In an embodiment of the arrangement, the control unit is configured to determine geometrical information regarding the recorded reflectance standard from the luminance density images recorded by the camera. For example, the control unit is configured to determine an outline and properties deduced from it (side length, aspect ratio) from a luminance density image. It is also possible that determination of such geometrical parameters occurs in a camera which may for example be configured as a smart camera. Here and in the following, a smart camera (or intelligent camera) is understood to be a type of camera having an internal processor capable of performing image processing operations. Thus, information derived (processed) from a raw image may be determined and output by a smart camera. In this case, the camera and the control unit are coupled with each other for transferring such geometrical parameters.

The position and/or the alignment of the reflectance standard relative to the camera may be determined from the geometrical parameters determined this way. For example, the control unit may convert the actually recorded luminance density image by projective rectification into a rectified luminance density image which would have been recorded with a reflectance standard aligned perpendicular to the optical axis of the camera. Moreover, the type of the recorded reflectance standard may be determined from the geometrical parameters.

In an embodiment, an arrangement comprises a measurement dummy configured identically with regard to outer dimensions to the holding device with the reflectance standard arranged therein.

The measurement dummy is configured such that in case of a collision of the positioning device and/or the license plate light with the measurement dummy, the positioning device and the license plate light remain unharmed. For example, the measurement dummy is made of a flexible plastic which yields when being touched. In the alternative or in addition, the measurement dummy may also be made from a material which will already be destroyed when subjected to a force which would not yet suffice to damage the positioning device or the license plate light.

The measurement dummy is arranged such that during the trajectory carried out relative to the holding device for charting a reflectance standard, a collision with the measurement dummy is excluded.

Moreover, the measurement dummy is arranged such that a collision with the holding device and/or the reflectance standard is excluded as the trajectory is carried out relative to the measurement dummy but otherwise equals the trajectory as in charting the reflectance standard.

An advantage of this embodiment is that errors in the planning of the trajectory of the positioning device may be detected prior to a charting operation in a particularly cost efficient and save way. This way, damage to the positioning device, the license plate light, the holding device and/or the reflectance standard, which could be caused by an erroneously planned trajectory, may be avoided.

BRIEF DESCRIPTION OF THE DRAWINGS

In the following, embodiments of the invention are explained in more detail with reference to drawings.

Corresponding parts are given the same reference signs in all figures.

DETAILED DESCRIPTION OF SPECIFIC EMBODIMENTS

Figure 1:
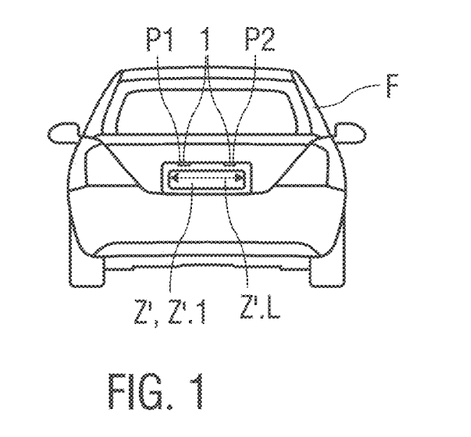
FIG. 1 is a schematic view of a vehicle with a license plate arranged thereon.

FIG. 1 shows a vehicle F with a license plate Z' arranged thereon. The license plate Z' has a reflecting surface Z'.1 and is illuminated by two license plate lights 1, which are arranged above the license plate Z' along a longitudinal direction Z'.L distributed to a first position P1 and a second position P2. Herein, the positions P1, P2 describe the relative position of one respective license plate light 1 relative to the license plate Z'.

The license plate lights 1 must be configured and arranged such that the light from the license plate lights 1 reflected on the reflecting surface Z'.1 is sufficient for reading the license plate Z' in the dark from a distance of approximately 10 to 20 meters. The luminance distribution reflected by the license plate Z' illuminated by the license plate lights 1 is specified in standards. Measurement methods for determining if these standards are complied with are known in the art, wherein a photometer is moved at a predetermined distance over an illuminated reflectance standard Z in a pattern fashion and captures at least one photometric parameter, e.g. a luminance density, at predetermined measurement points. Reflectance standards Z are geometrically identical with license plates Z' but do not have any characters printed or embossed thereon. To improve the isotropy in photometric charting, reflectance standards Z may be equipped with a diffuse and spectrally neutrally reflecting surface Z.1 in order to allow for a reproducible and comparable measurement of license plate lights 1.

Figure 2:
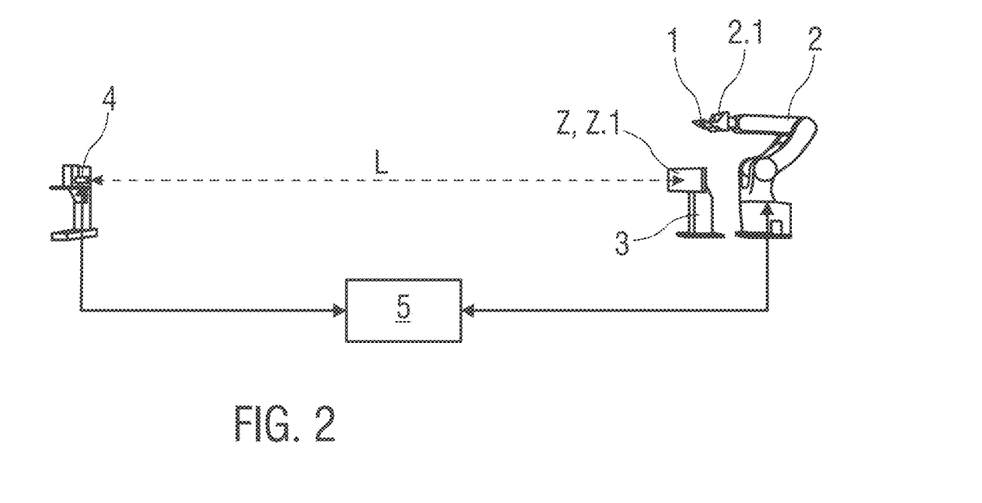
FIG. 2 is a schematic view of a measurement arrangement for photometrical charting of a reflectance standard illuminated by a license plate light.

FIG. 2 shows a measurement arrangement for photometrical charting of a reflectance standard Z illuminated by a license plate light 1. The measurement arrangement comprises a movable positioning device 2, a holding device 3, a camera 4 and a control and processing unit which is not shown in detail in FIG. 2.

The reflectance standard Z is arranged at the holding device 3, the reflecting surface Z.1 of the reflectance standard Z facing the camera 4. The camera 4 is arranged at a predetermined measurement distance L to the reflectance standard Z, wherein the optical axis of the camera 4 points approximately centrally and approximately perpendicular to the reflecting surface Z.1 of the reflectance standard Z.

In an embodiment, the camera 4 is arranged and aligned such that its optical axis hits the reflecting surface Z.1 within a circle having a radius of 5 millimeters around the center of area of the reflecting surface Z.1 at an angle between 85 degrees and 95 degrees.

The measurement distance L is chosen such that the entire reflecting surface Z.1 is charted preferably nearly perpendicular. In an embodiment, the measurement distance L is chosen such that the reflectance standard Z lies within an angle of at most ±5 degrees around the optical axis of the camera 4.

Likewise, greater angles around the optical axis of the camera 4 are possible though. Moreover, it is also possible to correct locally varying deviations, in particular ones that increase toward the image margin, of a beam of rays captured by the camera 4 from its optical axis by computationally correcting a reflectivity which is angle dependent and thus also dependent from the position in a luminance density image B1, B2 recorded by the camera 4.

In particular, the camera 4 is configured and arranged for photometric measurements by recording luminance density images B1, B2 which specify the distribution of a photometrical measure in space as will be explained in more detail in the following.

The movable positioning device 2 is configured and arranged such that license plate light 1 held thereby may be brought into the first position P1 as well as into the second position P2 relative to the reflectance standard Z and may be held there, respectively, as shown in the arrangement of the two license plate lights 1 on the vehicle F in FIG. 1.

Preferably, the movable positioning device 2 is configured as a robot 2, preferably a five-axis robot or a six-axis robot. At the end of a robot arm with multiple segments which are rotatable relative to each other, the robot 2 comprises a holder configured to hold the license plate light 1. The holder 2.1 may be configured as a grabber 2.1.

The camera 4, the robot 2 and the license plate light 1 are coupled with a control unit 5 which controls them. The control unit 5 may for example be configured as a personal computer (PC) comprising plug-in cards or universal interfaces, e.g. Universal Serial Bus (USB) and/or Gigabit Ethernet interfaces which are compatible to the camera 4, the robot 2 and the license plate light 1. The control unit 5 further comprises an interface by which date recorded and optionally processed by the camera 4 may be transmitted to the control unit 5.

The method of photometric charting a reflectance standard Z illuminated by at least one license plate light 1 is described in more detail in the following with reference to FIGS. 3A, 3B, 4A and 4B.

Figure 3A:
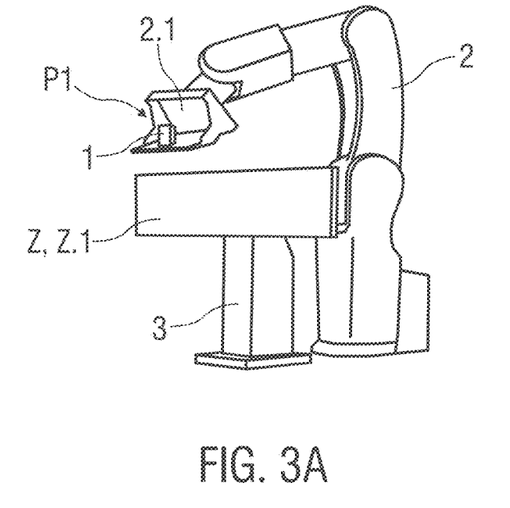
FIGS. 3A, 3B are schematic views of a positioning device for positioning a license plate light in a first position and in a second position.

The control unit 5 controls the robot 2 such that the license plate light 1 held by the robot 2 is moved to the first position P1 which complies in position (i.e. three-dimensional distance of the center of the license plate light 1) and alignment (i.e. angular position of the surface normal of the license plate light 1 relative to the reflecting surface Z.1) relative to the reflectance standard Z with the first position P1 of the license plate light 1 mounted at the vehicle F as shown in FIG. 3A.

Figure 4A:
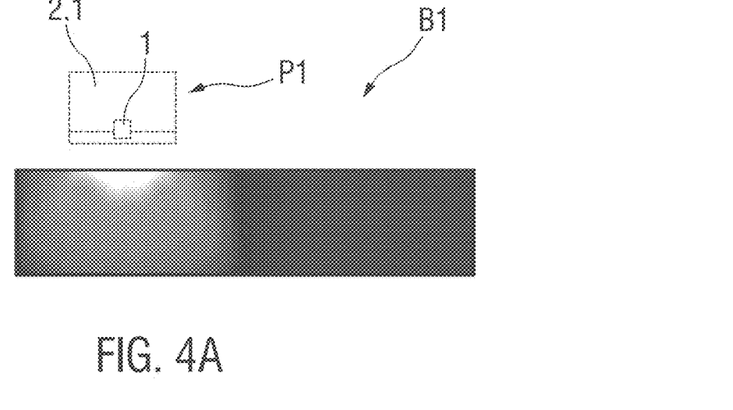
FIGS. 4A, 4B are schematic views of the luminance density image of the reflectance standard recorded in the first position and in the second position.

After reaching the first position P1, the license plate light 1 is switched on by the control unit 5. After a certain, predetermined burning-in period, the recording of a first luminance density image B1 by the camera 4 is triggered by the control unit 5 as shown in FIG. 4A. The burning-in period is chosen such that the illuminant of the license plate light 1, after the burning-in period has elapsed, emits a stable luminance density distribution corresponding to the behavior in continuous operation.

The first luminance density image B1 represents a two-dimensional distribution of a photometric parameter covering the entire reflectance standard Z, e.g. the distribution of the luminance density across the reflectance standard Z, which results from illuminating the reflectance standard Z by the license plate light 1 at the first position P1.

Figure 3B:
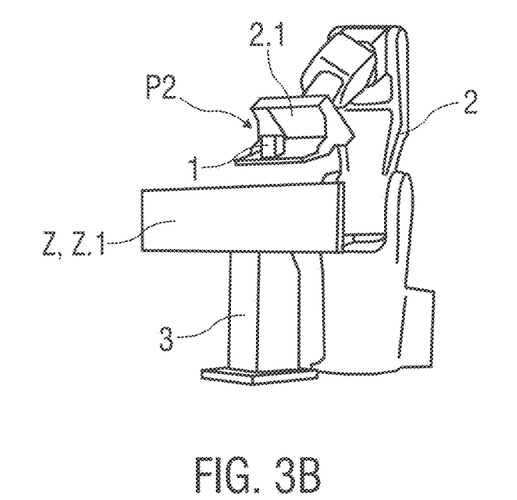

After having recorded the first luminance density image B1, the control unit 5 triggers movement of the license plate light 1 to the second position P2 which complies in position and alignment relative to the reflectance standard Z with the second position P2 of the license plate light 1 mounted at the vehicle F as shown in FIG. 3B.

During movement the license plate light 1 may optionally switched off and will then be switched on again at least for the predetermined burning-in period after the second position P2 has been reached.

Figure 4B:
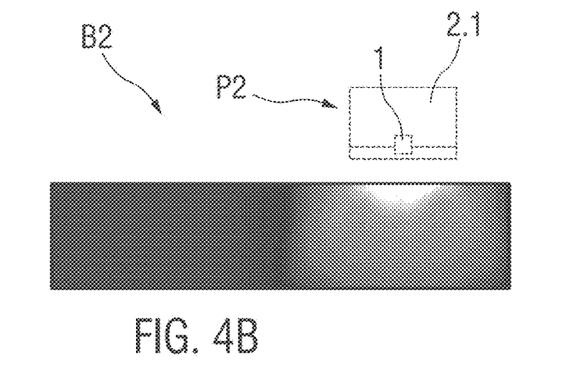

Subsequently, the recording of a second luminance density image B2 by the camera 4 is triggered by the control unit 5 as shown in FIG. 4B. The second luminance density image B2 represents a two-dimensional distribution of a photometric parameter covering the entire reflectance standard Z, which results from illuminating the reflectance standard Z by the license plate light 1 at the second position P2.

The luminance density images B1, B2 comprise basically congruent structures. For example, the reflecting surface Z.1 illuminated by the license plate light 1 arranged at the respective position P1, P2 is captured in the luminance density images B1, B2 with different brightness characteristics but with congruent outline. Likewise, the holding device 3 is captured congruently in both luminance density images B1, B2. By contrast, the holder 2.1 and the license plate light 1 held thereby are captured in different places in both luminance density images B1, B2.

Figure 5:
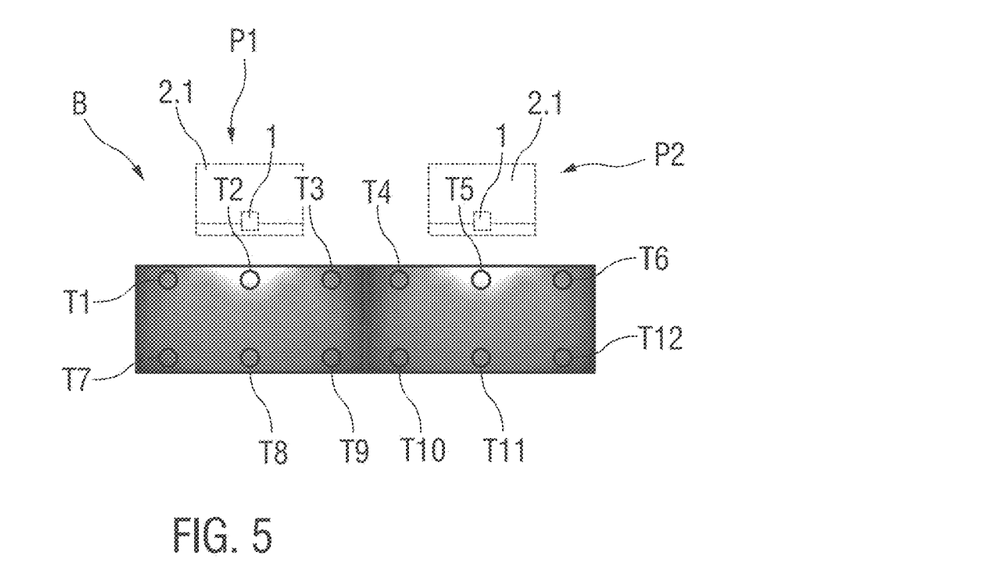
FIG. 5 is a schematic view of the summed up overall image of the illuminated reflectance standard.

The first luminance density image B1 and the second luminance density image B2 are summed up, e.g. pixel by pixel, to form an overall image B schematically shown in FIG. 5. For the further processing, only the area of the overall image B is relevant in which the surface Z.1 is recorded. This area of the overall image B represents a two-dimensional photometric distribution covering the entire reflectance standard Z which would result if the reflectance standard was simultaneously illuminated by a license plate light 1 arranged at the first position P1 and another one arranged at the second position P2.

Determination of the overall image B, e.g. by summing up the first luminance density image B1 and the second luminance density image B2 pixel by pixel, may be carried out by a camera 4 configured as a smart camera. In an embodiment, the determination of the overall image B may be carried out by the control unit 5 after the individual luminance density images B1, B2 have been transmitted there.

In a further embodiment, the license plate light 1 held by the robot 2 may be brought to further positions not depicted in more detail in FIGS. 3A and 3B. For example, the license plate light 1 may additionally be stopped below and/or lateral from the reflectance standard Z. For each of these further positions a respective further luminance density image is recorded by the camera 4.

Out of the totality of all recorded luminance density images B1, B2, an overall image B is formed by the camera 4 or by the control unit 5. In an embodiment, the luminance density images B1, B2 are summed up pixel by pixel. When summing up, different luminance density images B1, B2 may be weighted differently. It is also possible to register (i.e. subject them to an affine coordinate transformation) and/or filter luminance density images B1, B2 prior to superpose them to an overall image B. Filtering may be linear, e.g. low pas filtering, or smoothing or non-linear, e.g. median filtering. In addition to this, the skilled person knows many other image processing methods which may be applied to the luminance density images B1, B2 prior to superposing to obtain an overall image B.

This way, the photometrical distribution is determined which results from illumination of the reflectance standard Z by a multitude of license plate lights 1 which are respectively arranged at the first position P1, at the second position P2 and optionally at the further positions not shown in detail, wherein the sequence of the positions P1, P2 is specified by the control unit 5.

The method according to the invention thus allows in a very easy way to determine photometric distributions for a multitude of arrangement variants, in which license plate lights 1 in a varying numbers are arranged at in essentially arbitrary positions around the reflectance standard Z, by reprogramming or parametrizing the control unit 5. For example, photometric distributions occurring with illumination of a reflectance standard Z for entirely different types of vehicles, wherein the same type of license plate light 1 is used, may be determined without modifying the measurement setup.

Figure 6:
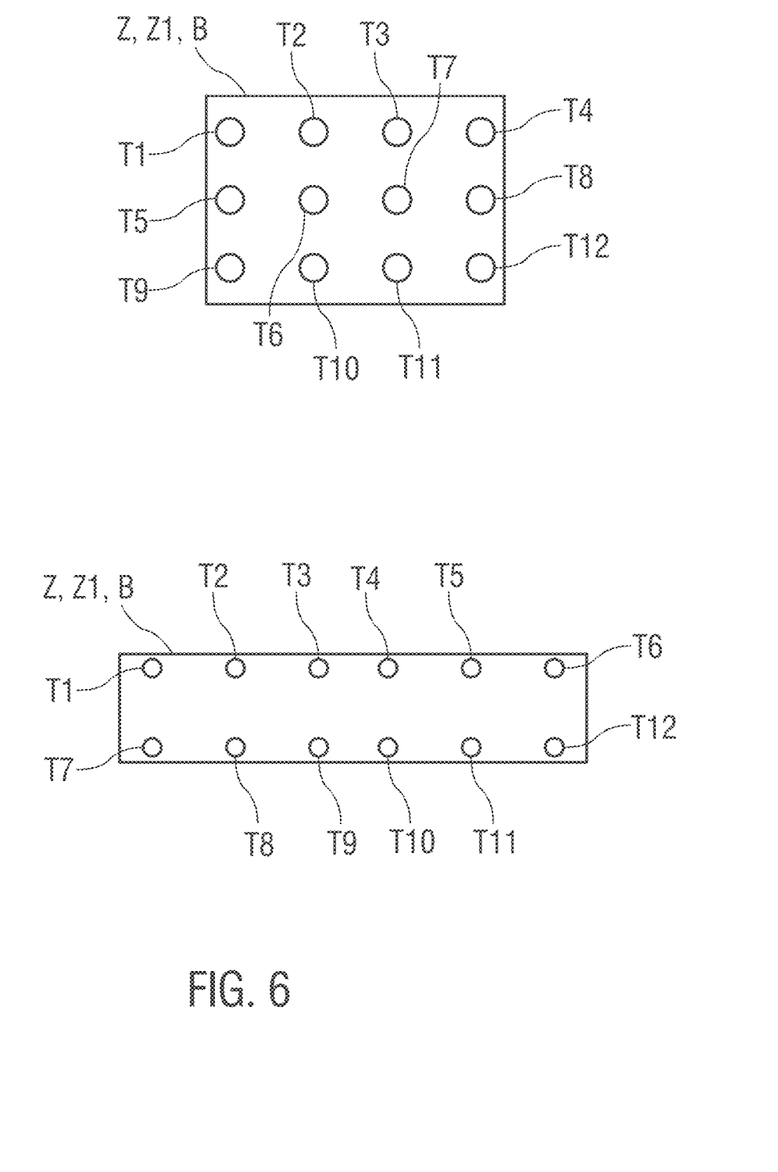
FIG. 6 is a schematic view of the arrangement of image areas in the overall image of the illuminated reflectance standard.

Moreover, in an embodiment, image areas T1 to T12 may be predetermined in the overall image B. Presently, the image areas T1 to T12 are arranged in a non-overlapping way. However, there are also possible arrangements in which image areas T1 to T12 overlap.

For example, circular image areas T1 to T12 may be predetermined by a center point and a radius, respectively, and comprise all pixels of the overall image B, respectively, which are within the respective radius around the respective center point, wherein the radiuses of all image areas T1 to T12 may be equal.

FIG. 6 is a schematic view of possible arrangements of image areas T1 to T12 which are adapted to different geometrical extensions of the reflectance standard Z and which may be specified by standard or regulation such that the grey scale value distribution of an overall image B of the reflectance standard Z is approximately equidistantly sampled by the respective image areas T1 to T12, wherein the image areas T1 to T12 are approximately entirely distributed across the reflectance standard Z.

In this embodiment, the grey scale values of an image area T1 to T12, which have been determined by summing up all luminance density images B1, B2, are averaged to one respective image area average. Each of these image area averages is thus assigned to an average luminance density for the respective image area T1 to T12.

This embodiment has the advantage that, instead of a planar, two-dimensional grey scale value distribution within the overall image B, specification of discrete image area averages respectively assigned to the image areas T1 to T12 is sufficient to describe the luminance density distribution across the reflectance standard Z. This way, comparison of the illumination of a reflectance standard Z by an arrangement of license plate lights 1 with the requirements of a standard and/or with an illumination resulting from another arrangement of license plate lights 1 is possible in a particularly easy way.

Figure 7:
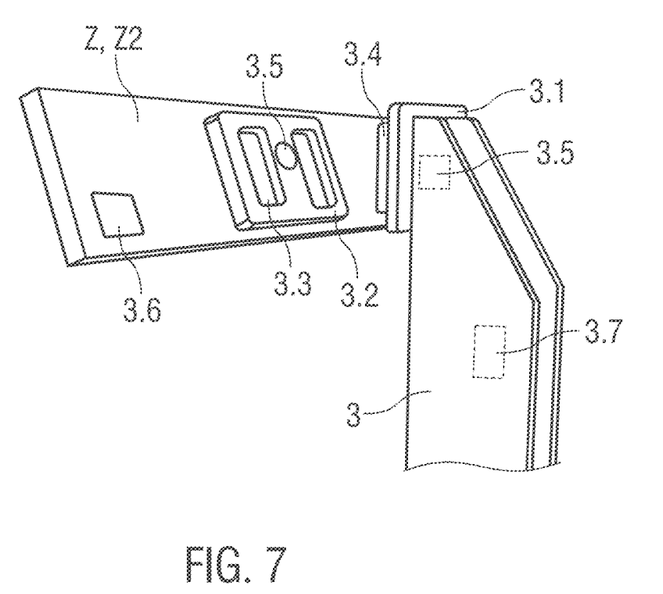
FIG. 7 is a schematic view of a holding device having a holding base arranged thereon and a removable holding socket.

In an embodiment schematically shown in FIG. 7, the holding device 3 comprises a holding base 3.1 which is form-fitting complementary to a holding socket 3.2. The holding socket 3.2 is arranged on the reverse Z.2 opposite the surface Z.1 of the reflectance standard Z.

For example, the holding socket 3.2 may comprise recesses 3.3 which are shaped corresponding to pins 3.4 on the holding base 3.1. The holding socket 3.2 and the holding base 3.1 are in particular shaped such that the holding socket 3.2 may be plugged onto the holding base 3.1 with little or no play and is held by same in a predetermined, preferably perpendicular, mounting position. In addition, at least one respective magnet 3.5 may be arranged on the holding socket 3.2 and on the holding base 3.1 in such a way that the holding socket 3.2 is pulled into the mounting position at the holding base 3.1 by the action of force of the magnets 3.5 and held there.

An advantage of this embodiment is that the reflectance standard Z may very easily be replaced at the holding device 3. For example, the reflectance standard Z with different geometry may be exchanged particularly easily and fast by pulling a reflectance standard Z with a first geometry off the holding device 3 and plugging a reflectance standard Z with a second geometry onto the holding device 3. Subsequently, the control unit 5 is reprogrammed or parametrized, e.g. by selecting an already existing control and evaluation program suited for the second geometry, in such a way that the license plate light 1 is moved to those positions P1, P2 which are provided for the illumination of a reflectance standard Z having the second geometry.

Subsequently, an overall image B is determined from the luminance density images B1, B2 recorded at each of the respective positions P1, P2, respectively by summing up, wherein the location and the extension of the reflectance standard Z within the overall image B are specified based on the selected second geometry of the reflectance standard Z.

As an option, the overall image B is evaluated by determining image area averages corresponding to a predetermined arrangement of image areas T1 to T12 if this is provided by the selected control and evaluation program.

Thus, the measurement effort in this embodiment is limited to plugging the reflectance standard Z on and off at the holding device 3 and manually selecting a control and evaluation program compatible with the geometry of the respectively plugged on reflectance standard Z at the control unit 5. As opposed to measurement arrangements known in the art, in which the reflectance standard Z as well as a plurality of license plate lights 1 are fixed, e.g. screwed, relative to a holding device 3, a large number of reflectance standards Z with different dimensions can be easily charted photometrically within a short time.

In a further embodiment, the positioning device 2 may be configured as a robot 2 configured to take a reflectance standard Z from a storage position not shown in detail, e.g. a shelf, and to plug it onto the holding device 3, to plug it off after the measurement has been performed and to put it back to the storage position. For example, for easily picking up and laying down the reflectance standard Z, the holder 2.1 of such a robot 2 may be equipped with a magnet switch.

In an embodiment of the invention, a radio frequency identification (RFID) transponder 3.6 is arranged at the holding socket 3.2. At the holding base 3.1, an RFID reading device 3.7 is arranged, configured to identify the RFID transponder 3.6.

In this embodiment, an allocation table is installed on the control unit 5, by which the geometry (i.e. the dimensions) of the reflectance standard Z which is arranged on the holding socket 3.2 carrying the respective RFID transponder 3.6 is allocated to a respective RFID transponder 3.6. When plugging on the holding socket 3.2 with the reflectance standard Z, the RFID transponder 3.6 is read out and its identifier is transmitted to the control unit 5. Based on the allocation table, those image areas T1 to T12 are set on the control unit 5, in which the luminance density images B1, B2 are to be evaluated according to the applicable standard for the allocated reflectance standard Z and its geometry.

Thus, in this embodiment, the manual selection or parametrizing of the evaluation program, i.e.: the manual indication of the image areas T1 to T12 to be evaluated and/or the manual input of the applicable standard for the charting of the clamped reflectance standard Z can be dispensed with and the measurement process may be additionally accelerated. In addition, the risk of erroneous inputs, e.g. the risk of selecting an incorrect standard, not matching the geometry of the plugged on reflectance standard Z, is reduced that way.

Figure 8:
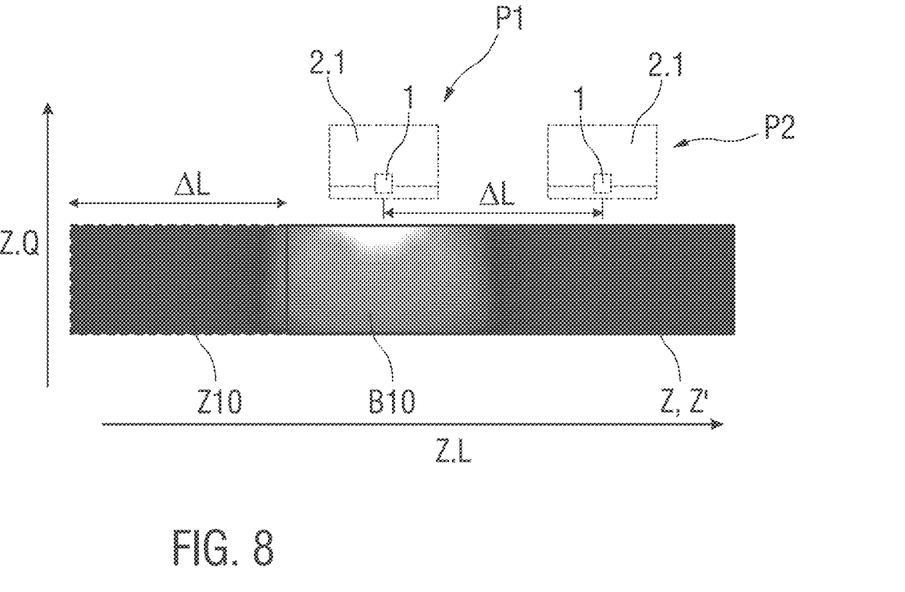
FIGS. 8 and 9 are schematic views of the transfer of a luminance density image from the first position to a second position.

FIG. 8 illustrates an extension of the invention relative to the method explained with reference to FIGS. 4A, 4B.

According to this method explained above, an overall image B is determined by sequential measuring and superposing luminance density images B1, B2. The overall image B describes the luminance density distribution which, in an example, is generated by two license plate lights 1 arranged at the positions P1, P2.

As opposed to this, in the embodiment of FIG. 8, an enhanced luminance density image B10 is recorded at only one (here for example the first) position P1. The enhanced luminance density image B10 is computationally transferred to the second position P2 by shifting the grey scale value distribution along the longitudinal direction Z'.L by the longitudinal distance ΔL between the second position P2 and the first position P1.

The enhanced luminance density image B10 shifted this way is superposed with the enhanced luminance density image B10 at the original measurement position (the first position P1) to form the overall image B.

In order to also have the longitudinal extension of the enhanced luminance density image B10 shifted to the second position P2 cover the entire range of the license plate Z' which is to be illuminated by the license plate lights 1, an enhanced reflectance standard Z10 is required which is enhanced relative to the reflectance standard Z and which has a prolonged longitudinal extension, the enhanced reflectance standard Z10 serving as a capturing plane of the enhanced luminance density image B10. The longitudinal extension of the enhanced reflectance standard Z10 is, starting from the first position P1 to the left, prolonged at least by the longitudinal distance ΔL between the first and second position P1, P2.

An advantage of this embodiment is that the measurement of the second luminance density image B2 at the second position P2 (and potentially also the measurement of further luminance density image at positions not shown in detail) can be dispensed with and be replaced by computational transfer of the enhanced luminance density image B10. This way, the measurement time may be reduced.

In an analogous way, measurements of multiple luminance density images B1, B2 at vertically (along a transverse direction Z'.Q) offset positions not shown in detail in FIG. 8, may be reduced to measuring a single enhanced luminance density image B10 which is mapped onto an enhanced reflectance standard Z10 prolonged corresponding to the vertical distance between the positions along the transverse direction Z'.Q. Likewise, measurements at multiple vertically and horizontally offset positions may be reduced to measurement at a single position P1, P2 this way.

Figure 9:
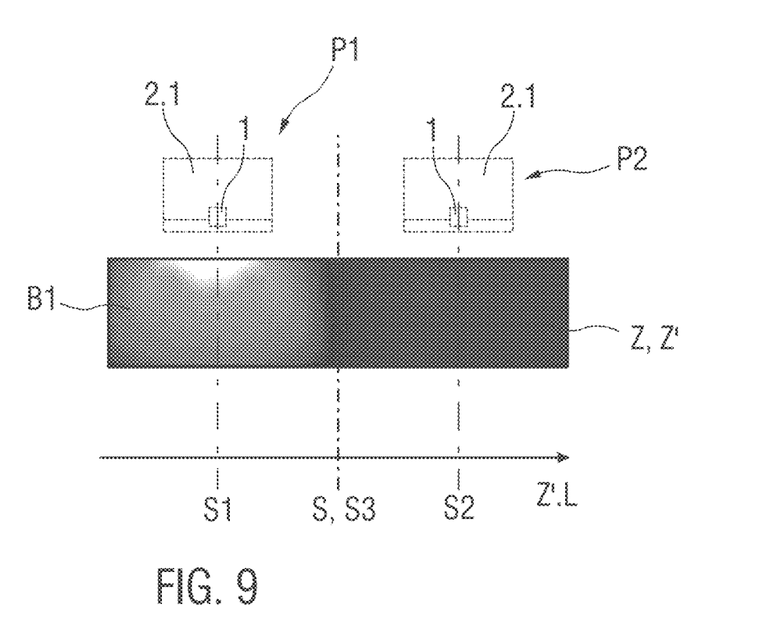

FIG. 9 illustrates another embodiment of the method for reducing the number of measurements which is simplified relative to the extension according to FIG. 8, wherein the embodiment of FIG. 9 utilizes a symmetry of the luminance density distribution on a license plate Z' or on a reflectance standard Z generated by a license plate light 1.

At the first position P1, a license plate light 1 generates a first luminance density image B1 which is mirror symmetrical to a first symmetry axis S1 if the license plate light 1 emits perpendicular to the longitudinal direction Z'.L. In the same way, a license plate light 1 arranged at the second position P2 would generate a second e luminance density image B2 (not shown in FIG. 9) which is mirror symmetrical to the second symmetry axis S2.

However, this second luminance density image B2 results computationally from the first luminance density image B1 by mirroring at a third symmetry axis S3 which runs along the perpendicular bisector on the connection line between the first and the second position P1, P2.

The measurement at the second position P2 is thus saved by the fact that the first luminance density image B1 (which is measured when the license plate light 1 has been arranged in the first position P1) is mirrored at the third symmetry axis S3 and that subsequently the first luminance density image B1 and its mirroring are superposed to form the overall image B.

An advantage relative to the extension of the method illustrated with reference to FIG. 8 is that a reflectance standard Z having the same dimensions as the license plate Z' can be used.

This embodiment of the method may also be used if the directions of beam of the license plate light 1 at the first position P1 and at the second position P2 are though not perpendicular to the longitudinal direction Z'.L but mirror symmetrical to a symmetry plane S standing perpendicular on the reflectance standard Z and running through the third symmetry axis S3. In such an arrangement, the first and second luminance density image B1, B2 are though not symmetrical to the respective symmetry axis S1, S2 but symmetrical relative to each other with regard to the third symmetry axis S3.

In an analogous way, other arbitrary symmetries, e.g. positions P1, P2 symmetrically arranged in the transverse direction Z'.Q, may be utilized to save measurements. It is also possible to combine the embodiment of a shift of an enhanced luminance density image B10 to another position illustrated by FIG. 8 with the utilization of symmetries in the arrangement of the positions P1, P2.

Figure 10:
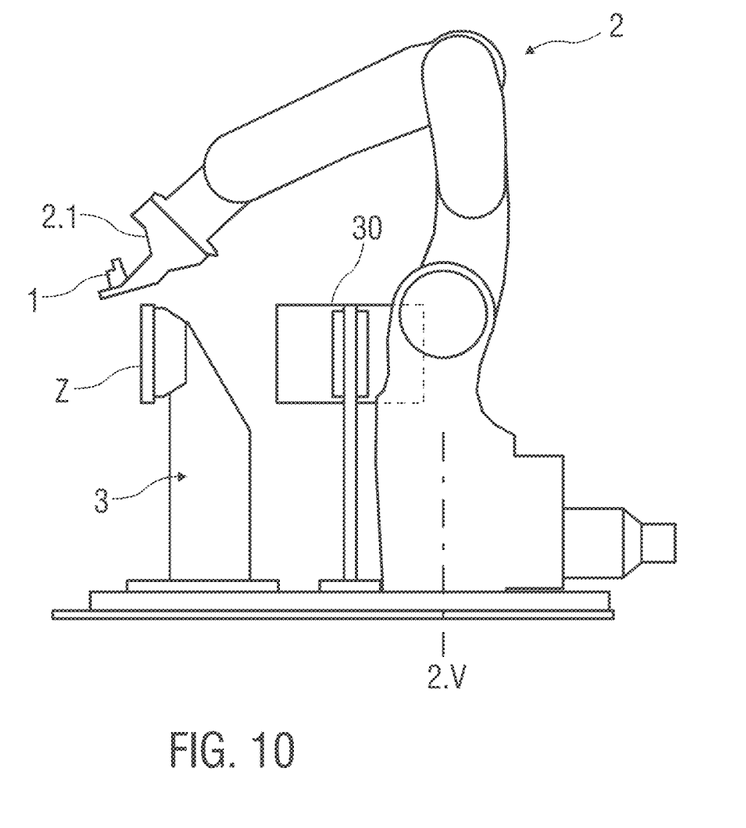
FIG. 10 shows the arrangement of a holding device and a measurement dummy around a positioning device.

FIG. 10 illustrates another aspect of the invention, in which a measurement dummy 30 is provided corresponding to the holding device 3 which is identical in its outer dimensions with holding device 3 with the inserted the reflectance standard Z.

The measurement dummy 30 is configured such that in case of a collision of the positioning device 2, which is presently configured as a robot, the positioning device 2, in particular its holder 2.1, and the license plate light 1 guided therein remain unharmed.

For example, the measurement dummy 30 is made of a flexible plastic which yields when being touched. In the alternative or in addition, the measurement dummy 30 may also be made from a material which will already be destroyed when subjected to a force which would not yet suffice to damage the positioning device 2 or the license plate light 1.

Due to the identical dimensions of the measurement dummy 30, a trajectory provided for the charting of the reflectance standard Z in the holding device 3 may first be tested at the measurement dummy 30. For this purpose, the measurement dummy 30 is arranged such that the holding device 3 with the reflectance standard Z lies outside the range swept over with the trajectory transferred to the measurement dummy 30.

For example, the measurement dummy 30 may be arranged rotated relative to the holding device 3 about a vertical rotation axis 2.V of the positioning device 2. Then, the positioning device 2 is firstly rotated by the respective angular offset about the vertical rotation axis 2.V from the normal measurement position facing the holding device 3 into a validating position facing the validation position. Subsequently, the trajectory planned for the charting of the reflectance standard Z is carried out identically.

Preferably, the angular offset between the holding device 3 and the measurement dummy 30 is 90 degrees or 180 degrees. Likewise, other arrangements of the measurement dummy 30 are possible, provided that the trajectory traversed from the validation position runs to the holding device 3 without collision.

According to this aspect of the invention it is possible in a particularly cost-efficient and save way to detect errors in the planning of the trajectory of the positioning device 2 prior to a measurement and to avoid damage which might be caused by a erroneously planned trajectory at the positioning device 2, the license plate light 1, the holding device 3 and/or the reflectance standard Z.

LIST OF REFERENCE SIGNS 1 license plate light
2 positioning device, robot
2.1 holder, grabber
3 holding device
3.1 holding base
3.2 holding socket
3.3 recess
3.4 pin
3.5 magnet
3.6 RFID transponder
3.7 RFID reading device
4 camera
5 control unit
30 measurement dummy
B1, B2 first, second luminance density image
B10 enhanced luminance density image
B overall image
F vehicle
L measurement distance
ΔL longitudinal distance
P1, P2 first, second position
S symmetry plane
S1, S2, S3 first, second, third symmetry axis
T1 to T12 image area
Z' license plate
Z'.1 surface
Z'.L longitudinal direction
Z'.Q transverse direction
Z reflectance standard
Z.1 surface
Z.2 reverse
Z10 enhanced reflectance standard

What is claimed is:

1. A method for photometrical charting of a reflectance standard illuminated by a license plate light, wherein
a camera releasable by a control unit is arranged and aligned relative to a holding device configured for holding a reflectance standard in such a way, that a luminance density image recorded by the camera at least covers the reflective surface of a reflectance standard held by the holding device,
the license plate light is arranged in a positioning device which is movable by the control unit,
the reflectance standard is arranged in the holding device in such a way that a reflective surface of the reflectance standard is captured by the camera,
the positioning device is controlled by the control unit in such a way that the license plate light arranged therein is traversed to at least one position, optionally to multiple positions sequentially, relative to the reflectance standard arranged in the holding device and held there, wherein
in each position, recording of at least one luminance density image by the camera is triggered by means of the control unit with the license plate light on, and
an overall image is formed by superposing of at least the recorded density distribution images.

2. The method according to claim 1, characterized in that the reflectance standard is arranged relative to the camera in such a way that each point on the reflective surface appears under an angle of at most 40 degrees, preferably under an angle of at most 5 degrees, relative to the optical axis of the camera, and wherein the at least one luminance density image is adapted to the geometry of the reflecting surface of the reflectance standard by projective rectification.

3. The method according to claim 1, characterized in that a calculated luminance density image for at least a second or further position of the license plate light is calculated from a luminance density image recorded by the camera for a first position of the license plate light and the overall image is formed by superposing the at least one recorded luminance density images and the at least one calculated luminance density image.

4. The method according to claim 1, characterized in that recorded luminance density images are filtered and/or registered against each other prior to superposing to form an overall image.

5. The method according to claim 1, characterized in that the overall image is formed by summing up the at least one recorded luminance density images, which are optionally filtered and/or registered against each other, pixel by pixel.

6. The method according to claim 1, characterized in that the recording of a luminance density image is released only after the license plate light has been on for a predetermined burning-in period.

7. The method according to claim 1, characterized in that in the partial area of the overall image, covering the reflective surface of the reflectance standard, image areas are defined and an image area average value is determined for each image area from the pixel values of the respective image area.

8. The method according to claim 7, characterized in that the reflectance standard held in the holding device is identified and, based thereon, an arrangement of image areas assigned to the reflectance standard is determined for the determination of one image area average value, respectively.

9. The method according to claim 8, characterized in that the reflectance standard is identified by means of a radio frequency identification (RFID) transponder.

10. The method according to claim 8, characterized in that the reflectance standard is identified by capturing at least one geometrical parameter of the imaged reflectance standard in the overall image and/or in at least one of the luminance density images and by assigning a type of the reflectance standard based on the at least one geometrical parameter.

11. The method according to claim 1, characterized in that, in a validation step preceding the charting of the reflectance standard, a trajectory of the positioning device with the license plate light arranged therein relative to the holding device is planned and carried out relative to a measurement dummy without collision, the trajectory being suitable for charting the reflectance standard, the measurement dummy being configured identically with regard to outer dimensions to the holding device with the reflectance standard arranged therein and arranged such that a collision with the holding device and/or the reflectance standard is excluded as the trajectory is carried out relative to the measurement dummy, and that a collision with the measurement dummy is excluded as the trajectory is carried out relative to the holding device, wherein the measurement dummy is configured such that the positioning device and/or the license plate light remain/remains unharmed in case of a collision with the measurement dummy.

12. An arrangement, comprising a control unit, a holding device configured for holding a reflectance standard, a camera configured for recording luminance density images of a reflectance standard held in the holding device, and a positioning device configured for holding a license plate light,
wherein the control unit is coupled with the camera and with the positioning device and configured to traverse a license plate light held by the positioning device to at least one predetermined position, optionally to multiple predetermined positions sequentially, relative to the holding device, to switch on the license plate light and to release the recording of at least one luminance density image by the camera, and
wherein the control unit and/or the camera are/is configured to determine an overall image from a plurality of luminance density images recorded by the camera.

13. The arrangement according to claim 12, characterized in that the holding device comprises a holding base and a holding socket, wherein the holding base is configured for receiving the holding socket in a releasable, form-fitting and free of play way, and wherein the holding socket is configured to receive the reflectance standard.

14. The arrangement according to claim 12, characterized in that the holding device comprises an RFID reading device coupled with the control unit and configured for reading out an identifier of an RFID transponder arranged at the reflectance standard and for transmitting this identifier to the control unit, wherein the control unit is configured to determine an arrangement of image areas for the determination of one image area average value, respectively, from a transmitted identifier.

15. The arrangement according to claim 13, characterized in that the holding device comprises an RFID reading device coupled with the control unit and configured for reading out an identifier of an RFID transponder arranged at the reflectance standard or at the holding socket and for transmitting this identifier to the control unit, wherein the control unit is configured to determine an arrangement of image areas for the determination of one image area average value, respectively, from a transmitted identifier.

16. The arrangement according to claim 12, characterized in that a measurement dummy, configured identically with regard to outer dimensions to the holding device with the reflectance standard arranged therein, is arranged relative to the positioning device such that a trajectory of the positioning device with the license plate light arranged therein can be carried out for charting the reflectance standard without a collision with the measurement dummy and that this trajectory can be carried out without a collision with the holding device and the reflectance standard held therein if the trajectory is transferred to the measurement dummy, wherein the measurement dummy is configured such that the positioning device and/or the license plate light remain/remains unharmed in case of a collision with the measurement dummy.

* * * * *